No. 830,126. PATENTED SEPT. 4, 1906.
E. S. WILDER.
LAND ROLLER.
APPLICATION FILED FEB. 21, 1906.

Inventor
Edward S. Wilder

Witnesses

UNITED STATES PATENT OFFICE.

EDWARD S. WILDER, OF MONROE, MICHIGAN.

LAND-ROLLER.

No. 830,126.  Specification of Letters Patent.  Patented Sept. 4, 1906.

Application filed February 21, 1906. Serial No. 302,240½.

*To all whom it may concern:*

Be it known that I, EDWARD S. WILDER, a citizen of the United States of America, residing at Monroe, in the county of Monroe and State of Michigan, have invented certain new and useful Improvements in Land-Rollers, of which the following is a specification, reference being had therein to the accompanying drawings.

The invention relates generally to land-rollers, and particularly to a device of this character wherein the roller proper is composed of a multiple of roll-sections.

The object of the invention is to produce an implement of this character that may be utilized either as a roller or as a clod breaker or crusher, as described, and to this end the invention consists in the novel and peculiar construction of the roll-section, whereby upon the movement of the sections in one direction the land may be rolled and upon movement in the opposite direction the crushing or slicing of the clods will be effected.

Figure 3:
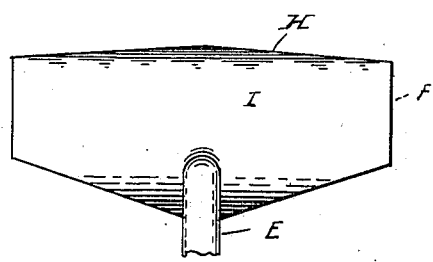
Figure 1:
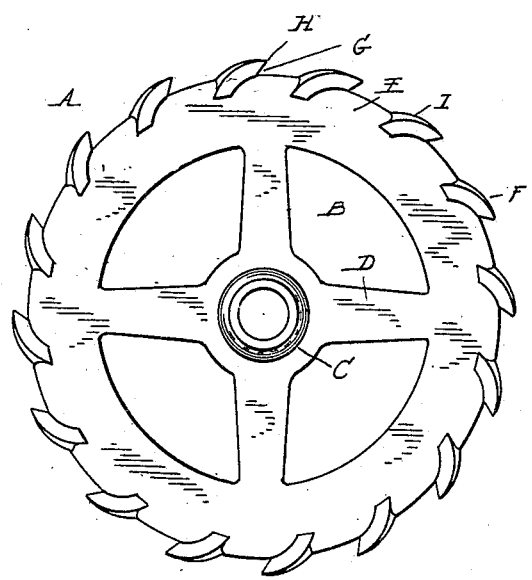
Figure 2:
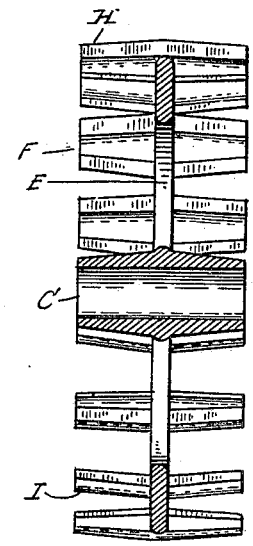

In the drawings illustrating my invention, Figure 1 is a view in side elevation of my improved roll-section. Fig. 2 is a sectional view thereof. Fig. 3 is a detached view, in front elevation, of one of the blades; and Fig. 4 is a sectional perspective view illustrating the application of the blades to the supporting-frame.

In the drawings thus briefly described, A represents a roll-section comprising a circular supporting member or frame B, in this instance a spider, provided with an elongated hub C, arms D, radiating centrally from the hub, and a comparatively wide rim E, the parts being preferably cast in one piece.

Figure 4:
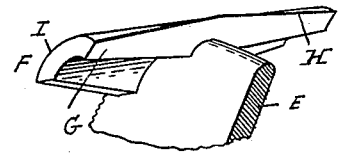

Arranged about the periphery of the support described and extending transversely thereof are a series of blades F, the blades being set in the rim, as plainly indicated in Figs. 3 and 4, and curved uniformly in one direction. Preferably the blades are cast in the support, and their free or outer ends are undercut, as at G, to produce cutting edges H. The curving of the blades, as indicated, produces convex rolling-surfaces I, which when the roll-section is turning in one direction will serve to roll the ground. The edges upon the blades are so formed that when the roll turns in the opposite direction they will be in angular relation to the ground and serve to cut or slice the clods as desired. In curving the blades, as described, I not only produce the convex surfaces required for rolling, but also bring the free or outer ends of the blades into contact with the rim. A support is thus provided for the extremities of the blades which greatly strengthens the structure.

What I claim is—

1. A roll-section comprising a narrow circular member, and a series of curved separated blades cast in the periphery and extending upon opposite sides of said member, the blades being shaped to present convex rolling-surfaces to the ground upon the rotation of the section in one direction and substantially vertical cutting edges upon movement in the opposite direction.

2. A roll-section comprising a circular supporting member, and separated transverse blades set in the periphery of said member and extending upon opposite sides thereof, the several blades in the series being curved in one direction forming convex rolling-surfaces and the free ends of the blades being undercut forming cutting edges.

3. A roll-section comprising a circular support having an elongated hub and a rim, and a series of separated transverse blades set in the rim and curved uniformly in one direction to contact at their free ends with the rim.

In testimony whereof I affix my signature in presence of two witnesses.

EDWARD S. WILDER.

Witnesses:
AMELIA WILLIAMS,
EDWARD T. AULS.